3,644,520
PHENYLETHANOLAMINES
David Hartley, Lawrence H. C. Lunts, and David Jack, London, England, assignors to Allen & Hanburys Limited, London, England
No Drawing. Filed Dec. 10, 1968, Ser. No. 782,742
Claims priority, application Great Britain, Dec. 21, 1967, 58,012/67
Int. Cl. C07c 103/38, 103/12
U.S. Cl. 260—562 A  8 Claims

ABSTRACT OF THE DISCLOSURE

Compounds having the skeletal structure

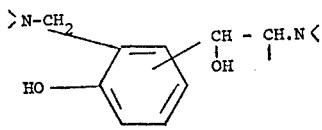

and physiologically acceptable acid addition salts thereof. The disclosed compounds possess stimulant or blocking actions on adrenergic-receptors.

---

This invention relates to novel phenylethanolamine derivatives and to compositions conaining the same having useful biological activity.

The present invention provides compounds of the general formula:

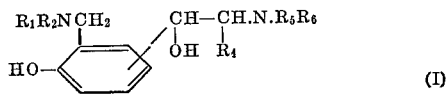

(I)

and physiologically acceptable acid addition salts thereof in which $R_1$ and $R_4$, which may be the same or different, each represent a hydrogen atom or a straight or branched chain alkyl radical containing from 1 to 6 carbon atoms;

$R_2$ represents a hydrogen atom, or a radical of the formula $R_2CO$— (in which $R_3$ represents a hydrogen atom, or a straight or branched chain alkyl radical containing from 1 to 6 carbon atoms, which radical may be optionally substituted by one or more halogen atoms or hydroxyl, alkyl radical, or a radical of the formula $R_2O$— in which $R_1$ has the meaning given above), or $R_2$ represents a radical of the formula $R_3R_1N \cdot CO$— (in which $R_1$ and $R_3$ have the meanings given above), or a radical of the general formula $R_3SO_2$— except that when $R_2$ represents $R_3SO_2$—, $R_3$ is not a hydrogen atom, nor the group $R_1O$—.

$R_5$ and $R_6$, which may be the same or different, each represent a hydrogen atom, or a straight or branched chain alkyl radical containing from 1 to 6 carbon atoms (which radical may be substituted by an amino or alkylated amino group, or a heterocyclic ring containing one or more hetero atoms, for example morpholino, indolyl etc.) or $R_5$ and $R_6$ each represent an aralkyl or aryloxyalkyl radical (both of which may optionally be substituted for example by one or more alkoxy or hydroxy groups) or a cycloalkyl radical.

As the compounds of general Formula I possess at least one asymmetric carbon atom, the invention also includes all the possible optically active form and racemic mixtures of these compounds. The racemic mixtures may be resolved by conventional methods, for example by salt formation with an optically active acid, followed by fractional crystallisation.

The compounds of the invention possess stimulant or blocking actions on adrenergic receptors.

The compounds of the present invention which have a stimulant effect on β-adrenergic receptors are used mainly as broncho-dilators. Known β-adrenergic stimulants, for example isoprenaline are potent cardiac stimulators at effective bronchodilator doses in many patients. Isoprenaline is also rapidly degraded by catechol-O-methyl transferase (COMT) and is therefore short acting after aerosol administration, and not effective by mouth at tolerated doses. The compounds of the present invention which are β-adrenergic stimulant exert a selective effect on bronchial muscle, and they are not substrates for (COMT). They are therefore active by mouth as well as by aerosol and they dilate bronchi without undue cardiovascular side effects.

Compounds of the invention found to have potent β-adrenergic stimulant activity are those in which $R_1$ represents a hydrogen atom and either $R_5$ or $R_6$ represents an alkyl group and include: N-[5-(2-tert-butylamino-1-hydroxyethyl)salicyl]methanesulphonamide, [5-(2 - tert-butylamino-1-hydroxyethyl)salicyl]urea, and N - [5 - (2-tert-butylamino-1-hydroxyethyl)salicyl]formamide.

For example, [5-(2-tert-butylamino-1 - hydroxyethyl) salicyl]urea, of Example 11, when given intravenously in doses of 12.5–25.0 μg./kg., was as active as isoprenaline in inhibiting the increased bronchial resistance produced in the guinea pig by treatment with acetylcholine.

However, on the isolated atria of the guinea pig the compound was less than 0.004 times as potent as isoprenaline in increasing the rate and force of contraction.

Other uses for the compounds of the invention which possess β-adrenergic stimulant activity may include the treatment of glaucoma.

The compounds of the invention which possess blocking activities on β-adrenergic receptors are those in which $R_1$ represents an alkyl group, for example N-[5-(2-tert-butylamino-1-hydroxyethyl)salicyl] - N-methylformamide (AH 5042), of Ex. 14 and N-[5-(2-tert-butylamino-1-hydroxyethyl)salicyl]-N-methylmethanesulphonamide, of Ex. 13 and are of use in the management of angina pectoris and certain other cardiovascular diseases. They may also be useful in protecting the heart against tachycardia induced by drugs or exercise, or as hypotensive agents.

For example, when AH 5042 was injected intravenously into the anaesthetised dog at a dose level of 0.1–0.2 mg./kg. it decreased blood pressure by 25 mm. Hg, heart rate by 10–20% and absolished the vasodepressor and positive chronotropic effects of injected isoprenaline. Doses of propanolol, a known β-blocked, required to produce these effects were in the range from 0.1–0.25 mg./kg. In contrast to propranolol, AH 5042 is devoid of quinidine like effects, and undesirable actions on the central nervous system.

Compounds of the invention which are α-adrenergic stimulants are those in which $R_5$ and $R_6$ both represent hydrogen, e.g. N-[-5-(2-amino - 1 - hydroxyethyl)salicyl] methanesulphonamide, of Ex. 15 may be used, for example, as nasal decongestants.

Specific preferred compounds of this invention are:

N-[5-(tert-butylamino-1-hydroxyethyl)salicyl]methanesulphonamide
[5-(2-tert-butylamino-1-hydroxyethyl)salicyl] urea
N-[5-(2-tert-butylamino-1-hydroxyethyl)salicyl] formamide
N-[5-(2-tert-butylamino-1-hydroxyethyl)salicyl] acetamide
N-{2-[2-(p-methoxy-α-methylphenethyl)amino-1-hydroxyethyl]salicyl}methanesulphonamide.
N-[5-(2-tert-butylamino-1-hydroxyethyl)salicyl] N-methylmethane-sulphonamide
N-[5-(2-tert-butylamino-1-hydroxyethyl)salicyl] N-methylformamide N-[5-(2-amino-1-hydroxyethyl)salicyl]methanesulphonamide.

The compounds of the present invention may be formulated in composition form for use in human or veterinary medicine for therapeutic and prophylactic purposes. They will in general be used in the form of their physiologically acceptable salts. Preferred salts include the hydrochloride, sulphate, maleate, acetate, fumarate, lactate and citrate. The compositions may be prepared in a conventional manner with the aid of carriers or excipients and formulatory agents as required, and with or without supplementary medicinal agents.

The compositions may include for instance solid and liquid preparations for oral use, suppositories or injections, or may be in a form suitable for administration by inhalation.

For administration by inhalation the compositions are conveniently in the form of an aerosol spray presentation.

Oral administration is most convenient in the form of tablets which may be prepared by conventional methods and may be coated if required. Soluble tablets suitable for sublingual administration may also be used.

Injections may be formulated with the aid of physiologically acceptable carriers and agents as solutions or suspensions, or as dry products for reconstitution before use.

The oral dosage range at which the active ingredients are administered may vary but is generally from 1 to 50 mg. for the stimulants and 50 to 250 mg. for the blockers. Pharmaceutical compositions may be provided as a single dose or a number of units.

In the form of an aerosol for bronchodilatation the dosage unit may be delivered by providing a valve so that it delivers a metered amount on use. Such a metered amount may be of the order of 50 to 200 $\mu$g. The compounds of the present invention may be prepared by a number of processes. In one process compounds of Formula II in which $R_2$ represents an acyl group of formula $R_3CO—$, $R_3SO_2—$ or $R_1R_3N \cdot CO—$ may be prepared from the corresponding compounds where $R_2$ is hydrogen and $R_5$ and $R_6$ do not represent hydrogen atoms by reaction with a functional derivative of an acid of formula $R_3COOH$, $R_3SO_3H$, or $R_1R_3N \cdot CO_2H$, for example the acid anhydride or acid chloride. In the case where $R_2$ represents $R_1NH \cdot CO—$ the acylation can be effected in an alternative process using an isocyanate of formula $R_1NCO$ or an alkali metal isocyanate may be used to give the compounds in which $R_1$ is H

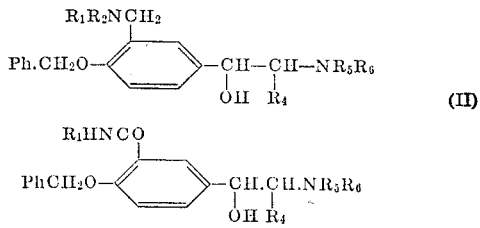

(II)

Removal of the protecting O-benzyl group with e.g. hydrogen and a noble metal catalyst gives the compounds I of the invention. When $R_5$ and/or $R_6$ represent benzyl groups the latter are removed simultaneously during this reduction to give compounds of structure I where $R_5$ and/or $R_6$ are hydrogen atoms.

Compounds of general Formula II ($R_2$=H) are prepared from compounds of general Formula III by reduction with for example lithium aluminium hydride or diborane. Compounds of general Formula III may be prepared inter alia by methods which are described in copending applications Nos. 669,263 of L. H. C. Lunts et al. filed Sept. 20, 1967 and 721,214 of D. T. Collin filed Apr. 15, 1968, assgined to a common assignee.

Compounds of general Formula II ($R_1$=alkyl, $R_2$=H) may also be obtained from amines of general Formula II ($R_1$=$R_2$=H) by condensation with aldehydes or ketones and reduction of the Schiff bases so formed with e.g. complex metal hydrides or by conversion to an acyl derivative followed again by reduction with for example, complex metal hydrides or diborane.

In another method compounds of general Formula IV in which $R_4$ has the meaning given herein and $R_7$ is a suitable protecting group e.g. acryl or benzyl are condensed with amines of general Formula V where $R_1$ has the meaning given above and then if desired acylated to give compounds of general Formula VI.

($R_2=R_3CO$; $R_3SO_2—$; or $R_1R_3 \cdot NCO—$)

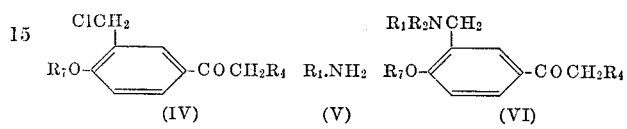

Compounds of general Formula VI (in which $R_2$ is not a hydrogen atom) may then be converted into compounds of general Formula II by elaboration of the side chain, by any of the methods described in said copending applications.

Such methods include for example, conversion of the compound VI to the corresponding haloketone in particular bromoketone and reaction of the resulting compound with an amine of the formula $R_6R_5NH$, followed by reduction of the side chain carbonyl group to a group CHOH. Where $R_7$ is an acyl group the benzyloxy group in structure II is replaced by an acyloxy group which may be removed by a final hydrolysis to give compounds of the invention I.

In a modification of this process compounds of general Formula IV may be reacted with a sulphonamide salt of general Formula VII where $R_1$ and $R_3$ have the meanings given herein and $R_1$ is optionally in addition an acyl group which may later be removed by hydrolysis and M is a metal.

$$R_3SO_2NR_1M \qquad (VII)$$

The following examples illustrate the invention:

EXAMPLE 1

3-aminomethyl-$\alpha$-[(benzyl-tert-butylamino)methyl]-4-benzyloxy-benzyl alcohol 5 - (2 - tert - butylamino - 1 - hydroxyethyl)salicylamide hydrochloride (50 g.), benzyl chloride (65.7 g.) sodium iodide (12.5 g.) potassium carbonate (36 g.) and ethyl methyl ketone (750 ml.) were refluxed for 5 hours, cooled and filtered. The filtrate was evaporated and the residue crystallised from ethyl acetate-light petroleum (B.P. 40–60°) as needles (45 g.), M.P. 136–7°. The dibenzylamide (15 g.) and lithium aluminium hydride (3 g.) were refluxed for 22 hours in tetrahydrofuran (375 ml.). After addition of water and evaporation to dryness the residue was partitioned between ether and water. The ethereal extracts were concentrated and treated with an excess of salicylic acid in ether to give a disalicylate (19 g.), M.P. 165–6°, after recrystallisation from ethyl acetate-ether. The free base was obtained from the salt as a colourless oil.

EXAMPLE 2

N-[5-(2-benzyl-tert-butylamino-1-hydroxyethyl)-2-(benzyloxy)-benzyl]methane sulphonamide Methane sulphonylchloride (2.5 ml.) was added at room temperature to the diamine (9.5 g.) obtained from Example 1 and pyridine (50 ml.). After 18 hours the mixture was poured into an excess of 2 N hydrochloric acid and extracted with chloroform. The extracts were neutralised with sodium bicarbonate, washed, dried and evaporated. The residual sulphonamide crystallised from ether-light petroleum (B.P. 40–60°) as a white solid (3.7 g.), M.P. 100–101°. By a similar method the following compounds were prepared:

N - [5 - (2 - benzyl - tert - butylamino-1-hydroxyethyl)-2-(benzyloxy)benzyl]benzenesulphonamide, M.P. 92–4° (from ether-cyclohexane).

N - [5 - (2 - benzyl - tert-butylamino-1-hydroxyethyl)-2-(benzyloxy)benzyl]butanesulphonamide. The hydrochloride was a white solid, M.P. 181–2° (decomp.) (from methanolethyl acetate).

N - [5 - (2 - benzyl - tert-butylamino-1-hydroxyethyl)-2-(benzyloxy)benzyl]-2-propanesulphonamide. The hydrochloride had M.P. 174° (from methanol-ether).

N - [5 - (2 - benzyl - tert-butylamino-1-hydroxyethyl)-2-(benzyloxy)benzyl] - α - toluenesulphonamide hydroride, M.P. 181°.

EXAMPLE 3

N-[5-(tert-butylamino-1-hydroxyethyl)salicyl]methanesulphonamide

The methanesulphonamide (1.5 g.), from Example 2, was hydrogenated in ethanol (30 ml.) at room temperature and atmospheric pressure with 10% paddadium on charcoal (1.0 g.). After filtration of the catalyst and removal of the solvent the methanesulphonamide was left as a deliquescent solid, M.P. 60–80°. The acetate salt had M.P. 171° (from methanol-ether). The p-anisic acid salt was prepared by treating the residue obtained after filtration of the catalyst and removal of the catalyst and solvent with p-anisic acid (1 g.) in ethyl acetate. The precipitate was crystallised from methanol-ethyl acetate to give the p-anisic acid salt, M.P. 204°.

By a similar method the following compounds were obtained:

N - [5 - (2 - tert - butylamino-1-hydroxyethyl)salicyl]butanesulphonamide. The acetate salt had M.P. 167–7.5° (from methanol-ethyl acetate).

N - [5 - (2 - tert-butylamino-1-hydroxyethyl)salicyl]benzenesulphonamide. The acetate salt had M.P. 193°–5° (decomp.) (from methanol-ethyl acetate).

N - [5 - (2 - tert-butylamino-1-hydroxyethyl)salicyl]-2-propanesulphonamide, M.P. 189° (from methanol).

EXAMPLE 4

N-[5-(2-benzyl-tert-butylamino-1-hydroxyethyl)-2-(benzyloxy)benzyl]acetamide

The diamine (5 g.) as obtained from Example 1 was refluxed with acetic anhydride (1.25 ml.) in benzene (50 ml.) for 2 hours. After cooling, ether was added and the solution was washed with sodium carbonate solution and water. The solution was dried over magnesium sulphate and evaporated. The residue was warmed with 2 N hydrochloric acid (50 ml.) for 30 minutes, cooled and extracted with chloroform. The organic extracts were washed with sodium carbonate solution, dried, and evaporated to leave the acetamide.

EXAMPLE 5

N - [5 - (benzyl-tert-butylamino-1-hydroxyethyl)-2-benzyloxy)benzyl]-2(2,2-trifluoroacetamide The diamine (7.5 g.), as obtained in Example 1, in chloroform 250 ml.) was treated slowly with trifluoroacetic anhydride (2.2 ml.). After 3 hours at room temperature the solution was poured into water and the chloroform layer separated and washed with dilute hydrochloric acid and water. The chloroform solution was then washed with sodium carbonate solution, dried and evaporated to leave the trifluoroacetamide as an oil.

EXAMPLE 6

N-[5-(benzyl-tert-butylamino-1-hydroxyethyl)-2-(benzyloxy)benzyl]benzamide

The diamine disalicylate salt (10.0 g.), as obtained from Example 1, was stirred with ether (50 ml.) and 2 N sodium hydroxide solution (24 ml.). Benzoyl chloride (3 g.) was added dropwise followed by more 2 N sodium hydroxide to maintain an alkaline pH. The ethereal solution was separated, washed with water, dried and evaporated to leave an oil which gave the benzamide as a cream friable solid on trituration with light petroleum.

EXAMPLE 7

N-[5-(2-benzyl-tert-butylamino-1-hydroxyethyl)-2-(benzyloxy)benzyl]formamide

The diamine (9 g.) as obtained from Example 1, was refluxed for 17 hours with ethyl formate (50 ml.) and evaporated to dryness under reduced pressure. The residue was extracted with a mixture of dilute hydrochloric acid and chloroform. The chloroform solution was washed with water, neutralised with sodium bicarbonate solution, dried, and evaporated to yield the crude formamide.

EXAMPLE 8

N-[5-(2-benzyl-tert-butylamino-1-hydroxyethyl)-2-(benzyloxy)benzyl]carbamic acid, ethyl ester The diamine (7.5 g.), as obtained in Example 1, in ether (50 ml.) was stirred over a solution of sodium hydroxide (0.6 g.) in water (3 ml.) and a solution of ethyl chloroformate (1.56 g.) in ether (2 ml.) added dropwise. After 5 minutes the ethereal layer was separated, washed with water, dried and evaporated to yield the carbamic acid ester as an amber oil.

EXAMPLE 9

1-[5 - (2-benzyl-tert-butylamino-1-hydroxyethyl)-2-(benzyloxy)benzyl]3,3-diethylurea The diamine (3.75 g.), as obtained in Example 1, was dissolved in dry pyridine (10 ml.) and diethylcarbamoyl chloride (2 g.) added dropwise with stirring. After standing overnight at room temperature, the solution was poured on to ice and excess concentrated hydrochloric acid. The precipitated gum was extracted into chloroform, washed with sodium bicarbonate solution, dried and evaporated to give the diethyl urea.

EXAMPLE 10

[5-(2-benzyl-tert-butylamino-1-hydroxyethyl)-2-(benzyloxy)benzyl]urea

The diamine disalicylate salt (5.5 g.) as obtained in Example 1, in ethanol (50 ml.) containing potassium cyanate (2.3 g.) was refluxed for 2 hours. The solution was then evaporated to dryness and the residue partitioned between ether and sodium carbonate solution. The ethereal layer was separated, washed with water, dried over sodium carbonate and evaporated to dryness to leave the urea as a friable solid.

EXAMPLE 11

[5-(2-tert-butylamino-1-hydroxyethyl)salicyl]urea

The urea (3.0 g.) as obtained in Example 10, in ethanol (20 ml.) was reduced in an atmosphere of hydrogen in the presence of 10% palladium on charcoal catalyst (0.5 g.). After 2.5 hours the hydrogen uptake ceased and the catalyst was removed and the solution evaporated to dryness to yield the urea as a white friable solid. The fumarate salt, isolated as a monohydrate, had M.P. 172.7° (from methanol-ethyl acetate).

By a similar method the following compounds were prepared:

Hydrogenation of the diethyl urea (2.4 g.) as isolated in Example 9, gave 1-[5-(2-tert-butylamino-1-hydrocyethyl)salicyl]-3,3-diethylurea. The hydrochloride was a white solid, M.P. 198–200° (from methanol ether).

Hydrogenation of the carbamic acid ester as obtained in Example 8, gave N-[5-(2-tert-butylamino-1-hydroxyethyl)salicyl]carbamic acid, ethyl ester. The acetate salt had M.P. 179–81° (from methanol-ethyl acetate).

Hydrogenation of the formamide, as obtained in Example 7, gave N-[5-(2-tert-butylamino-1-hydroxyethyl)salicyl]formamide. The acetate salt had M.P. 169–70° (decomp.)(from ethyl acetate-methanol).

Hydrogenation of the trifluoro-acetamide, as obtained in Example 5, gave N-[5-(2-tert-butylamino-1-hydroxyethyl)salicyl]-2,2,2-trifluoro-acetamide. The hydrochloride had M.P. 179° (from methanol-ethyl acetate-ether).

Hydrogenation of the acetamide, as obtained in Example 4, gave N - [5 - (2 - tert-butylamino-1-hydroxyethyl)salicyl]acetamide. The acetate salt had M.P. 185° (from methanol-ethyl acetate).

Hydrogenation of the dibenzylamine disalicylate, as obtained in Example 1, gave 3-(aminomethyl)-α-(tert-butylaminomethyl)-4-hydroxy benzyl alcohol, disalicylate salt, M.P. 180–1° (from methanol-ethyl acetate).

EXAMPLE 12

α-(Benzyl-tert-butylamino methyl)-4-(benzyloxy)-3-(methylaminomethyl) benzyl alcohol A solution of the formamide (11.5 g.), as obtained in Example 7, in dry tetrahydrofuran (50 ml.) containing lithium aluminium hydride (2.5 g.) was refluxed for 30 hours. The excess hydride was decomposed by dropwise addition of water (4 ml.) and the mixture filtered. Evaporation of the filtrate gave the diamine as a yellow oil which formed a colourless dihydrochloride M.P. 157–9° (from acetone).

EXAMPLE 13

N-[5-(2-tert-butylamino-1-hydroxyethyl)salicyl]-N-methylmethane-sulphonamide

The diamine (4.1 g.) as obtained in Example 12, was dissolved in pyridine (10 ml.) and treated with methane sulphonyl chloride (1.3 g.) with stirring while maintaining the temperature of the mixture below 10°. After 18 hours at room temperature, the mixture was poured on to ice-cold dilute hydrochloric acid and the precipitated hydrochloride isolated. Crystallisation from ethyl acetate gave colourless crystals, M.P. 179°.

Hydrogenation of the free base derived from this product over palladium on carbon gave the N-methylmethanesulphonamide as a friable solid. The acetate salt had M.P. 154° (from methanol-ether).

EXAMPLE 14

N-[5-(2-tert-butylamino-1-hydroxyethyl)salicyl]-N-methylformamide

A solution of the diamine (4.2 g.), as obtained in Example 12, was refluxed with dry ethyl formate (50 ml.) for 33 hours. The ethyl formate was removed under reduced pressure and the residue hydrogenated over palladium on carbon to give the N-methylformamide as an amber oil. The acetate salt had M.P. 160–2° (from methanol-ethyl acetate).

EXAMPLE 15

N-[5-(2-amino-1-hydroxyethyl)salicyl] methanesulphonamide 4-acetoxy-3-chloromethylacetophenone (90.4 g., 0.4 mole) and the sodium salt of N-acetylmethanesulphonamide (65 g., 0.4 mole) were stirred and heated at 100° in formdimethylamide (500 ml.). The solvent was removed by distillation in vacuo and the residue dissolved in chloroform (500 ml.) and washed with water (3× 200 ml.). The chloroform solution was dried and a solution of bromine (20 ml.) in chloroform (100 ml.) added slowly. (There was a long induction period and it was necessary to heat the chloroform at the reflux after the addition of 10% of the bromine. After cooling, the rest of the bromine was added at room temperature). The chloroform solution was washed with water (3× 200 ml.) and evaporated in vacuo to give a viscous oil (161 g.)

This oil (153 g., 0.38 mol) was dissolved in benzene (500 ml.) and dibenzylamine (142 g.) added. An exothermic reaction occurred and the mixture was stirred overnight. The dibenzylamine hydrobromide which precipitated was filtered off.

The benzene solution was stirred vigorously and 2 N hydrochloric acid (500 ml.) added. The benzene layer was decanted, ethanol (200 ml.) was added and the mixture heated at reflux to give a clear solution. After 1½ hours at reflux the solution was cooled, excess sodium carbonate added and the mixture was extracted with ethyl acetate. The ethyl acetate layer was washed with water, dried, and concentrated to 500 ml. and a solution of maleic acid (30 g.) in ethanol (200 ml.) added. The precipitate which formed was filtered, washed with ethanol and dried at 50° to give N-[2-(benzyloxy)-5-(N,N-dibenzylglycyl)-benzyl] methanesulphonamide, M.P. 170–173°, raised to 179–80° after recrystallisation from methanol.

The maleate (80 g.) was treated with excess 10% sodium carbonate solution and ethyl acetate. The ethyl acetate solution was separated, washed with water dried and evaporated in vacuo. The gummy residue was dissolved in ether (500 ml.) and stirred. The base crystallised as a white solid M.P. 92°.

The base (55 g.) was dissolved in ethanol (1 litre), stirred with charcoal (5 g.) and filtered. Glacial acetic acid (7.5 ml., 1 equivalent) was added and the solution was hydrogenated at 50° in the presence of 10% palladium oxide on carbon catalyst (5 g.) The theoretical quantity of hydrogen (0.3 cu. ft.) was absorbed in 2 hours. The solution was filtered evaporated to a volume of 200 ml. and an equal volume of ethyl acetate was added. The acetate salt of the phenethanolamine was obtained as an off-white solid, M.P. 165°.

EXAMPLE 16

N-{5-[2-(p-methoxy-α-methylphenethyl)amino-1-hydroxyethyl]salicyl}methanesulphonamide N - [5 - (2-amino-1-hydroxyethyl)salicyl]methanesulphonamide acetate salt, as obtained in Example 15, (2.0 g.) and p-methoxyphenyl-2-propanone (1.3 g.) were heated under reflux in ethanol (40 ml.) for 2 hours. The hot solution was added to 10% Pt on carbon catalyst (0.25 g.), suspended in ethanol (5 ml.) and hydrogenated overnight at 60°.

The solution was filtered and evaporated to give an oil, which was acidified (2 N HCl) and extracted with ethyl acetate. The insoluble oily hydrochloride was separated and converted into the free base.

This was redissolved in ethyl acetate, to which ether was then added until precipitation of an oil was complete. The clear solution was decanted and allowed to evaporate to dryness at room temperature to leave an off-white solid, which was triturated with hot ethyl acetate and filtered to give the required base, M.P. 147.5–151.05°, raised to 155.5–157° (from acetone-ether).

By a similar method the following compounds were prepared:

N-[5-(2-benzylamino-1-hydroxyethyl)salicyl]methanesulphonamide acetate salt, a white solid, M.P. 142°.
N-[5-(2-cyclopentylamino-1-hydroxyethyl)salicyl] methanesulphonamide, M.P. 145–7°.
N{5-[1-hdroxy-2-(1-methyl-2-phenoxy)ethylamino ethyl]salicyl}methanesulphonamide acetate hemihydrate, M.P. 87.5–89°.

EXAMPLE 17

3-(2-benzylisopropylamino-1-hydroxybutyl)-6-(benzyloxy)-benzylamine

A mixture of 5 - (1-hydroxy-2-isopropylaminobutyl) salicylamide (5.5 g.), benzyl chloride (7.25 g.), sodium iodide (1.38 g.), potassium carbonate (3.96 g.) and methyl ethyl ketone (82.5 ml.) was refluxed with stirring for 20 hours. The mixture was cooled and filtered and the filtrate was evaporated to dryness under reduced pressure. The solid which had formed was dissolved in ethyl acetate and the solution was washed with water to remove any inorganic residue. The ethyl acetate layer was dried over magnesium sulphate and evaporated to dryness. The oil which formed was triturated with light petroleum (B.P. 40–60°), giving 3 - (2-benzylisopropylamino-1-hydroxybutyl)-6-benzyloxy-benzamide (3.3 g.) as a buff coloured solid, M.P. 142°.

A solution of the dibenzylamide (2.0 g.) in dry tetrahydrofuran (30 ml.) was added slowly, with stirring, to lithium aluminium hydride (0.5) in tetrahydrofuran (30 ml.) in an atmosphere of nitrogen. The mixture was refluxed for 144 hours, then cooled and treated dropwise with water (10 ml.). The tetrahydrofuran was removed by evaporation under reduced pressure. The residue was partitioned between ether and water and the aqueous layer was extracted several times with ether. The combined ethereal portions were dried over magnesium sulphate and evaporated under reduced pressure, leaving 3-(2 - benzylisopropylamino - 1-hydroxy-butyl)-6-(benzyloxy)-benzamide as an amber oil (1.4 g.).

This amine may be used directly of acylation, dibenzylation etc., as described in the previous examples.

EXAMPLE 18

Tablets

Preparation of 20,000 tablets each containing 50 mg. of N-[5 - (2 - tert-butylamino - 1-hydroxyethyl) salicyl]N-methylformamide.

Calcium sulphate dihydrate (4.5 kg.) and maize starch (400 g.) are mixed together and sufficient of a 10% w./v. solution of providone in water is mixed in to give a damp cohesive mass. The damp mass is granulated through a suitable comminuting mill to produce 12 mesh granules. The granules are dried in a fluid bed dryer and then passed through a 16 mesh screen. The prepared granules are carefully blended with finely powdered N-[5-(2-tert-butylamino - 1-hydroxyethyl) salicyl]N-methylformamide (2.0 kg.) and magnesium stearate (30 g.) and then compressed on a suitable tabletting machine to produce tablets each weighing about 300 mg.

Tablets

Preparation of 20,000 tablets each containing 5 mg. of [5-(2 tert-butylamino-1-hydroxyethyl)salicyl]urea.

Calcium sulphate dihydrate (2.5 kg.) and maize starch (300 g.) are mixed together and sufficient of a 10% w./v. solution of povidone in water is mixed in to give a damp cohesive mass. The damp mass is granulated through a suitable comminuting mill to produce 12 mesh granules. The granules are dried in a fluid bed dryer and then passed through a 16 mesh screen. The prepared granules are carefully blended with finely powder [5 (2-tert-butylamino - 1-hydroxyethyl)salicyl] urea (100 g.) and magnesium stearate (15 g.) and then compressed on a suitable tabletting machine to produce tablets each weighing about 150 mg.

Capsules

Preparation of 10,000 hard gelatine capsules each containing 25 mg. of N-[5-(2-tert-butylamino-1-hydroxyethyl(N-methylformamide].

Finely powdered N - [5 - (2-tert-butylamino-1-hydroxyethyl)salicyl]-N-methylformamide (250 g.) is mixed with sufficient microcrystalline cellulose to produce a satisfactory fill in No. 1 hard gelatin capsules.

Capsules

Preparation of 5000 hard gelatin capsules each containing 10 mg. of [5 - (2 - tert-butylamino-1-hydroxy-ethyl) salicyl]urea.

Finely powdered [5-(2-tert-butylamino-1-hydroxyethyl) salicyl]urea (50 g.) is mixed with sufficient microcrystalline cellulose to ensure an adequate fill in a No. 2 hard gelatin capsule.

AEROSOL FORMULATIONS [1]

Formula:                                                100 μg. dose
[5 - (2 - tert - butylamino - 1 - hydroxyethyl)sali-
  cyl]urea, (micronised) _____μg__ 100
Oleic acid _____μg__  10
Dichlorodifluoromethane _____mg__  61
Trichlorofluoromethane _____mg__  24

[1] Expressed in terms of single dose.

Method

The active ingredient, the oleic acid and part of the dichlorodifluoromethane are mixed together. The suspension is then diluted with the remainder of the dichlorodifluoromethane, and the requisite quantity is filled into aluminum aerosol containers which are closed by a suitable metering valve. The containers are then pressurised with trichlorofluoromethane.

Formula:                                                100 μg. dose
[5 - (2 - tert - butylamino - 1 - hydroxyethyl)
  salicyl]urea sulphate, (micronised)_____μg__ 120
Sorbitan trioleate _____μg__ 120
Dichlorodifluoromethane B.P.C. _____mg__  61
Trichlorofluoromethane B.P.C. _____mg__  24

Method

Mix together the active ingredient, sorbitan trioleate, and part of the dichlorodifluoromethane. The suspension is then diluted with the remainder of the dichlorodifluoromethane, and the requisite quantity is filled into aluminium aerosol containers, which are closed by a suitable metering valve. The containers are then pressurised with trichlorofluoromethane.

We claim:
1. A compound selected from the group consisting of (1) a compound of the formula

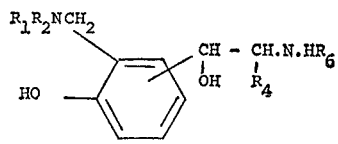

wherein $R_1$ is H or alkyl of 1 to 6 carbon atoms; $R_2$ is $R_3CO$— wherein $R_3$ is H, alkyl of 1 to 6 carbon atoms or $CF_3$; $R_4$ is H or alkyl of 1 to 6 carbon atoms; and $R_6$ is H or alkyl of 1 to 6 carbon atoms; and (2) a physiologically acceptable acid addition salt thereof.

2. A compound as claimed in claim 1 in which the ethanolamine side chain is para to the phenolic hydroxy group.

3. A compound as claimed in claim 1 in which $R_1$ represents a hydrogen atom and $R_6$ represents an alkyl group.

4. A compound as claimed in claim 1 in which $R_1$ represents an alkyl group.

5. A compound as claimed in claim 1 in which $R_6$ represents a hydrogen atom.

6. N -[5 - (2 - tert - butylamino - 1 - hydroxyethyl)salicyl] formamide.

7. N - [5 - (2 - tert - butylamino - 1 - hydroxyethyl)salicyl]acetamide.

8. N - [5 - (2 - tert - butylamino - 1 - hydroxyethyl)salicyl]N-methylformamide.

References Cited

UNITED STATES PATENTS 3,461,164  8/1969  Schulte et al. _____ 260—570.6

OTHER REFERENCES

Roberts et al., Basic Principles of Org. Chem. (Benjamin, New York, 1964), pp. 531, 535, 661, 722.

Fieser et al., Advanced Org. Chem. (Reinhold, New York, 1962), p. 506.

HENRY R. JILES, Primary Examiner

C. M. SHURKO, Assistant Examiner

U.S. Cl. X.R.

260—247.1, 247.2 A, 326.12, 326.13, 326.14, 501.17, 553 A, 556 A, 556 AR, 562 B, 562 K, 562 N; 424—248, 274, 316, 320, 321, 322, 324